United States Patent
Dalton et al.

(10) Patent No.: US 7,363,053 B2
(45) Date of Patent: Apr. 22, 2008

(54) SYSTEM FOR INTEGRATED MOBILE DEVICES

(75) Inventors: Bryan L. Dalton, Endicott, NY (US); Michael A. Heaton, Owego, NY (US)

(73) Assignee: Lockheed Martin Corproation, Bethesda, MD (US)

( * ) Notice: Subject to any disclaimer, the term of this patent is extended or adjusted under 35 U.S.C. 154(b) by 471 days.

(21) Appl. No.: 10/809,641

(22) Filed: Mar. 25, 2004

(65) Prior Publication Data

US 2004/0192365 A1    Sep. 30, 2004

(51) Int. Cl.
- H04B 7/00 (2006.01)
- H04B 1/38 (2006.01)
- H04Q 7/20 (2006.01)
- H04M 1/00 (2006.01)

(52) U.S. Cl. ............ 455/556.1; 455/517; 455/557
(58) Field of Classification Search ......... 455/517, 455/556.1, 557
See application file for complete search history.

(56) References Cited

U.S. PATENT DOCUMENTS

| | | | |
|---|---|---|---|
| 6,112,206 A | | 8/2000 | Morris et al. |
| 6,192,029 B1 | | 2/2001 | Averbuch et al. |
| 6,549,773 B1 * | | 4/2003 | Linden et al. ........... 455/426.1 |
| 6,590,875 B1 * | | 7/2003 | Niwa .................. 370/328 |
| 6,832,102 B2 * | | 12/2004 | I'Anson ............... 455/556.1 |
| 2001/0046862 A1 | | 11/2001 | Coppinger et al. |
| 2002/0078209 A1 * | | 6/2002 | Peng ................. 709/227 |
| 2002/0078248 A1 | | 6/2002 | Janik |
| 2002/0099894 A1 | | 7/2002 | Kehoe et al. |
| 2002/0103935 A1 * | | 8/2002 | Fishman et al. .......... 709/246 |
| 2002/0104887 A1 | | 8/2002 | Schlieffers et al. |
| 2002/0122394 A1 | | 9/2002 | Whitmore et al. |
| 2003/0006998 A1 | | 1/2003 | Kumar |
| 2003/0017845 A1 | | 1/2003 | Doviak et al. |
| 2003/0034898 A1 | | 2/2003 | Shamoon et al. |
| 2003/0078034 A1 * | | 4/2003 | Tsutsumi et al. .......... 455/412 |
| 2003/0157962 A1 * | | 8/2003 | Tourilhes ............... 455/557 |
| 2003/0224760 A1 * | | 12/2003 | Day ................... 455/412.1 |
| 2003/0235184 A1 * | | 12/2003 | Dorenbosch et al. ....... 370/352 |
| 2004/0137908 A1 * | | 7/2004 | Sinivaara et al. ........ 455/452.1 |
| 2004/0198322 A1 * | | 10/2004 | Mercer ................ 455/412.1 |
| 2004/0205154 A1 * | | 10/2004 | Dalton et al. ............ 709/217 |

* cited by examiner

*Primary Examiner*—Quochien B. Vuong
*Assistant Examiner*—Andrew Wendell
(74) *Attorney, Agent, or Firm*—Tarolli, Sundheim, Covell & Tummino LLP (57) ABSTRACT

A communication system includes a data concentrator computer, a gateway device for communicating with the data concentrator computer, a first mobile data acquisition device communicating with the gateway device, and a second mobile data acquisition device communicating with the gateway device. The gateway device allows direct communication between the first and second mobile data acquisition devices without communication with the data concentrator computer.

20 Claims, 2 Drawing Sheets

SYSTEM FOR INTEGRATED MOBILE DEVICES

FIELD OF INVENTION

The present invention relates to a system for mobile devices, and more specifically, to a system for a plurality of integrated mobile devices.

BACKGROUND OF THE INVENTION

A conventional data collection system may include a mobile unit utilizing applications software to collect and process data by a sequence of automated and/or manual operations. A typical automated process is the non-contact scanning of bar code data by means of a cyclically deflected laser beam or an image photosensor of the CCD type. Once a valid bar code reading has been obtained, a keypad may be manually operated to indicate an associated quantity. The user may then manually initiate a further operation, for example, the on-line transmission of the data to a remote host computer by a known means such as a radio frequency communications link.

The conventional data collection system typically includes one or more clients for collecting data and a centralized computer to concentrate the data. For a large data collection system (i.e., parcel tracking, census taking, meter reading, etc.), a human workforce that collects the data is large and geographically distributed across physical buildings, cities, and states. A data collection workforce uses the mobile units to automate the data collection process.

The conventional mobile unit transfers the collected data by communicating with another computer. Typically, the mobile unit has enough technical capability to perform all communications functions with respect to interfacing directly with the other computer without relying on still another computer to act as a mobile unit controller.

SUMMARY OF THE INVENTION

A communication system in accordance with the present includes a data concentrator computer, a gateway device for communicating with the data concentrator computer, a first mobile data acquisition device communicating with the gateway device, and a second mobile data acquisition device communicating with the gateway device. The gateway device allows direct communication between the first and second mobile data acquisition devices without communication with the data concentrator computer.

Another communication system in accordance with the present invention includes a data concentrator computer, a mailbox for communicating with the data concentrator computer, a first mobile data acquisition device communicating with the mailbox, and a second mobile data acquisition device communicating with the mailbox. The mailbox allows peer to peer communication between the first and second mobile data acquisition devices without communication with the data concentrator computer.

A computer program product in accordance with the present invention allows communication between a plurality of mobile devices. The computer program product includes: a first instruction for activating a first mobile device; a second instruction for requesting a roll call from a gateway device by the first mobile device; a third instruction for broadcasting a please identify message to a second mobile device and a third mobile device; and a fourth instruction for providing peer to peer communication between the first mobile device and the second and third mobile devices.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENT

A system in accordance with the present invention may manage two or more mobile devices performing a business data collection application with batch, near real time, and real time communication and thereby increase resource utilization/efficiency of an information technology infrastructure. The resource utilization increase is due to mobile devices being programmed to communicate asynchronously to meet the operational needs of the business application.

A conventional business application of a mobile device may communicate with a centralized computer to store and/or forward collected data to another computer. In addition, the centralized computer may perform additional overhead functions during a communication session with the mobile device. Some overhead functions may be messaging to synchronize time, collect device management information, and verify the correct level/version of a software application.

If a centralized computer is located in close proximity to the mobile devices, network and computer resource utilization may not be greatly impacted due to local area networks having excess capacity to manage more data. Further, the cost to operate a local area network is less than a wide area network. When a mobile device communicates with a central computer over a wide area network, increasing costs for data network services may be incurred.

A system in accordance with the present invention performs asynchronous communications by creating an efficient communication method to reduce utilization of information technology resources such as networks and computer communications without adding more computers to perform local communications management of the mobile devices. Using an integrated architecture for the mobile devices, a mobile device services gateway may provide a service for temporarily storing data. The mobile device services gateway may become a mailbox for all of the mobile devices to communicate between each other. Peer to peer mobile communication is thus provided by the mobile device services gateway.

Peer to peer communication may begin with one mobile device initiating a predetermined message to the mobile device services gateway. The mobile devices services gateway broadcasts the message to the other active mobile devices. Each active mobile device responds to the predetermined message and performs a specific function related to the predetermined message. The mobile device services gateway collects the mobile device responses and notifies the initiating mobile device when all other active mobile devices have responded. The initiating mobile device thereby retrieves all of the collected data.

If the next step is to communicate with a central computer, then one communication session with the central computer is performed by the initiating mobile device through the mobile device services gateway. Two conventional approaches have been available to perform this function in a conventional environment.

One conventional approach docks the mobile devices for communications and charging in cradles. The cradles are connected to an intermediate computer for collecting data and managing the mobile devices. The intermediate computer controls communications to the central computer.

The other conventional approach directly attaches a cradle to a modem and a central computer for remote communication. The cradle electrically connects the mobile devices with the modem and central computer. Each mobile device initiates a communication session with the central computer. If a second mobile device communicates with the central computer when the first mobile device is docked, and the software program allows communication during that session, then two mobile devices communicate concurrently with the central computer. If the software program does not allow concurrent communication, then the mobile device communicates independently at a different time period. These two conventional approaches perform independent communication sessions with an intermediate or central computer managing those sessions.

The system in accordance with the present invention controls mobile device asynchronous communication in the mobile device and the mobile device services gateway without any impact to an external network. A mechanism for controlling mobile device asynchronous communication may be performed by a remote intermediate or centralized computer. The communication may extend into the facilities information technology networking infrastructure or the wide area network. When the communication extends beyond a mobile device, there necessarily are additional and redundant costs for the networking services.

Conventional mobile device cradles do now allow interprocess, or "peer to peer", communication between mobile devices. Thus, a cradle with more processing capabilities, such as the mobile device services gateway in accordance with the present invention may fulfill this function. The system may locally manage mobile devices and communicate with a centralized computer. The system defines a mechanism for controlling and monitoring each mobile device. More specifically, the system controls and monitors mobile devices by asynchronously communicating with a centralized computer.

The mobile device services gateway provides a service for temporarily storing data. The temporary data storage may thus become a mailbox for all mobile devices to communicate between each device. This peer to peer mobile communication is thereby established by the mobile device services gateway.

One scenario provided for by the system may have one mobile device initiating a predetermined message to the mobile device services gateway. The mobile device services gateway may broadcast the predetermined message to the other active mobile devices. Each active mobile device may respond to the predetermined message and perform a specific function related to the predetermined message. The mobile device services gateway may collect the mobile device responses and notify the initiating mobile device when all other active mobile devices have responded. The initiating mobile device may thereby retrieve, for example, the data collected by all of the active mobile devices. A next instruction may be to have the initiating mobile device transfer the collected data to a central computer. One communication session between the initiating mobile device and the central computer may then be performed.

Another scenario, describing the relationships between the components, is described below to put the above example into perspective. The example is termed a "Roll Call". A mobile device function may be termed "Am I Alive?" describing whether a mobile device is programmed to communicate. "Am I Alive?" may be a generic set of communication functions that the system uses.

Figure 1:
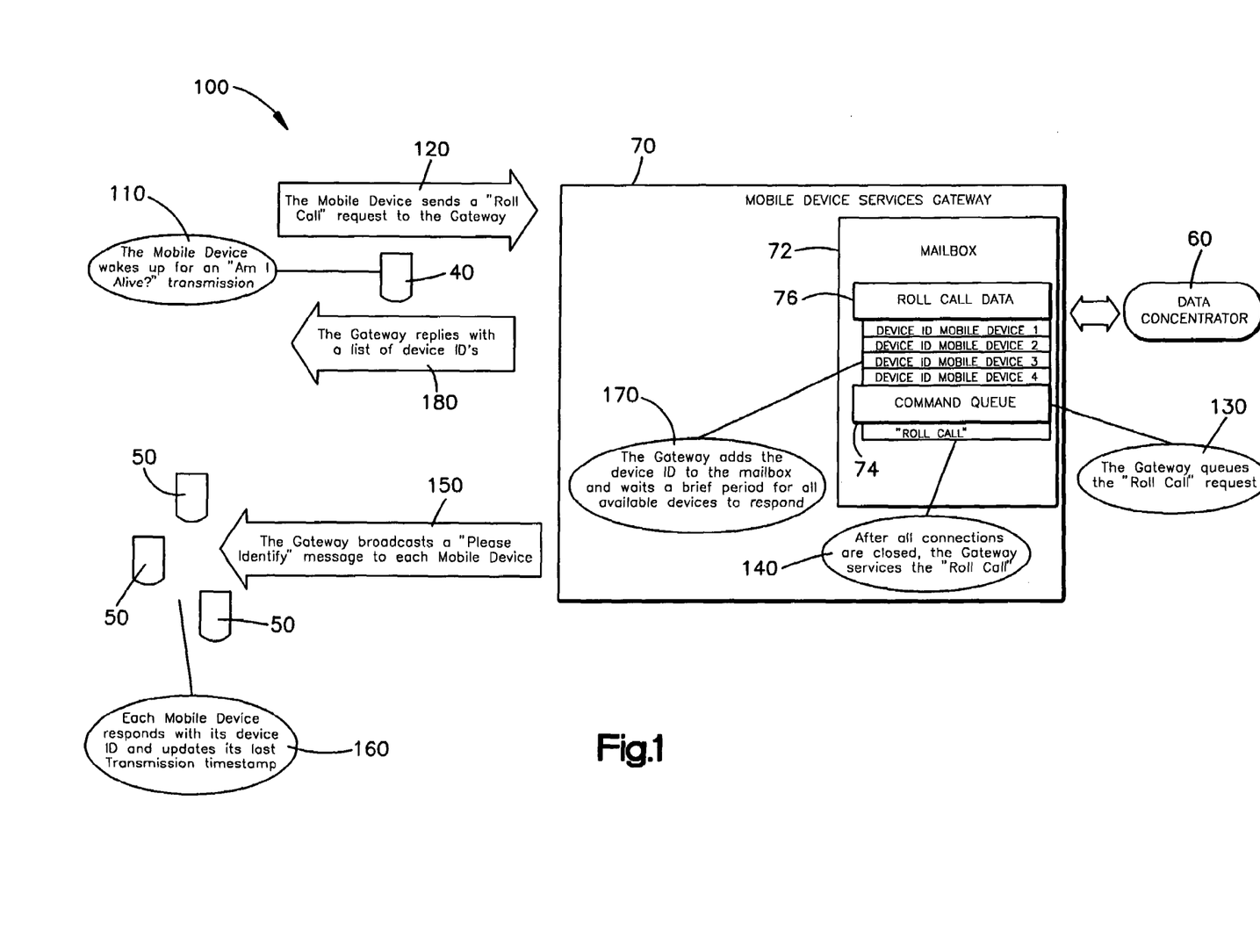
FIGS. 1 and 2 are a schematic representation of an example system in accordance with the present invention.

The Roll Call example is shown in FIG. 1. The example system 100 begins with step 110. In step 110 a mobile device 40 at a site "wakes up" for an "Am I Alive?" transmission. By definition in this example, a mobile device 40 may only initiate the "Am I Alive?" transmission if it has no data to transmit to a data concentrator computer 60. Following step 110, the system 100 proceeds to step 120.

In step 120 the system 100 transmits a "Roll Call" command from the mobile device 40 to a mobile device services gateway 70. The "Roll Call" command is a query request. Following step 120, the system 100 proceeds to step 130. In step 130, the system 100 queues the "Roll Call" command at command queue 74 of a mailbox 72 of the mobile device services gateway 70. Following step 130, the system 100 proceeds to step 140. In step 140, the system 100 services the "Roll Call" command when all host connections are closed. The mobile device services gateway may also flush any device IDs that are in a roll call data portion 76 of the mailbox 74. These device Ids may be left over from a previous "Am I Alive?" session. Following step 140, the system 100 proceeds to step 150.

In step 150, the mobile device services gateway 70 services the Roll Call command by broadcasting a "Please Identify" message to each active mobile device 50. Following step 150, the system 100 proceeds to step 160. In step 160, each active mobile device 50 transmits a device ID to the mobile device services gateway 70. Each active mobile device 50 may also update its last roll call timestamp, which generally is defined by the Mobile Device responding to a roll call request, not the mobile device actually communicating with the data concentrator computer 60. Following step 160, the system 100 proceeds to step 170.

In step 170, the mobile device services gateway 70 adds each device ID received from the active mobile devices 50 to the mailbox 72. A timeout threshold may determine how long the mobile device services gateway 70 waits following a last response before the gateway considers a broadcast complete. Following step 170, the system 100 proceeds to step 180.

In step 180, the mobile device services gateway 70 may construct a message for reply to the initiating mobile device 40. The message may contain the device IDs of all other active mobile devices 50 that have responded to the broadcast of step 150. At this point, the local data collection and aggregation of FIG. 1 is complete.

Figure 2:
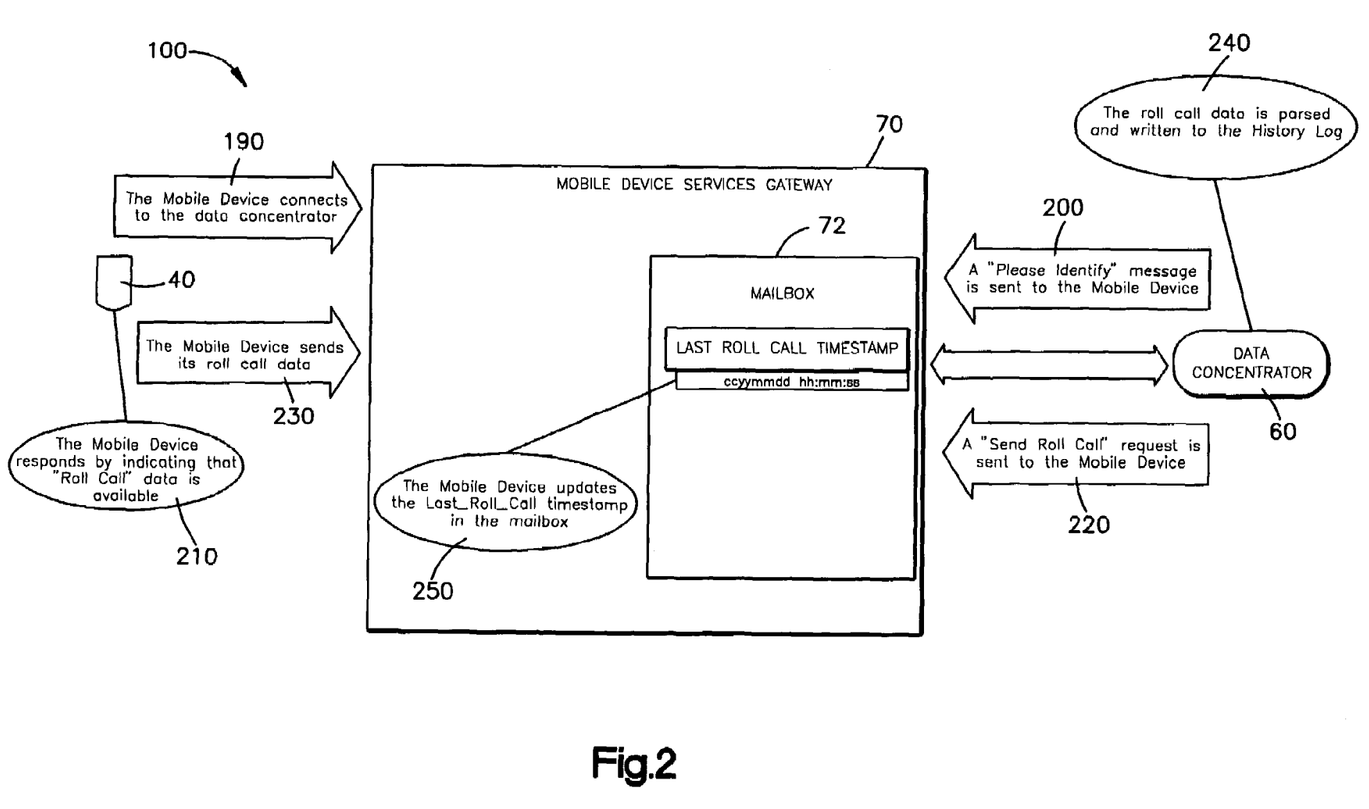

Following step 180, the system 100 proceeds to step 190 of FIG. 2. In step 190, the initiating mobile device 40 begins a conversation with the data concentrator computer 60. Following step 190, the system 100 proceeds to step 200. In step 200, the data concentrator computer sends a "Please Identify" message to the initiating mobile device 40 through the mobile device services gateway 70. Following step 200, the system 100 proceeds to step 210.

In step 210, the initiating mobile device 40 sends an Identify Response message to the data concentrator computer 60 indicating that a Roll Call is available for transmission. Following step 210, the system 100 proceeds to step 220. In step 220, the data concentrator computer 60 checks whether the flag is set. If the flag is set, the data concentrator computer 60 issues a "Send Roll Call" message to the initiating mobile device 40 through the mobile device services gateway 70 to send roll-call data. Following step 220, the system 100 proceeds to step 230.

In step 230, the initiating mobile device 40 sends the roll call data to the data concentrator computer 60 through the mobile device services gateway 70. Following step 230, the system 100 proceeds to step 240. In step 24, the data concentrator computer 60 parses the data and stores the data in a history log file. Following step 240, the system 100 proceeds to step 250. In step 250, the initiating mobile device 40 sets a Last Roll Call Timestamp in the mailbox 72 of the mobile device services gateway 70.

To further understand the example "Roll Call" scenario, Table 1 below describes the messaging context between the various components (40, 50, 60, 70) of the example system 100. The text in italics represents more than one Mobile Device operating asynchronously.

TABLE 1

"Roll Call" Message Method

| Sequence | Mobile Device User | Initiating Mobile Device | Other Mobile Devices | Mobile Device Services Gateway | Data Concentrator |
|---|---|---|---|---|---|
| 01 | Mobile Device has not communicated in the past 24 hours | | | | |
| 02 | | Software application timer initiates program process to prepare "Am I Alive" message | | | |
| 03 | | Software Application sends "Roll Call" message to Mobile Device Services Gateway | | | |
| 04 | | Software Application remains in listen mode for "Roll Call Done" Message | | | |
| 05 | | | | Mobile Device Services Gateway receives and queues "Roll Call" message | |
| 06 | | | | Mobile Device Services Gateway completes all current requests and closes all connections with Mobile Devices | |
| 07 | | | | Mobile Device Services Gateway deletes existing Roll Call mailbox list and creates new Roll Call mailbox list with Device ID of initiating Mobile Device | |
| 08 | | | | Process "Roll Call" message by broadcasting (multiple times over time period) "Respond to Roll Call" | |

TABLE 1-continued

"Roll Call" Message Method

| Sequence | Mobile Device User | Initiating Mobile Device | Other Mobile Devices | Mobile Device Services Gateway | Data Concentrator |
|---|---|---|---|---|---|
| | | | | message to other Mobile Devices | |
| 09 | | | Receives broadcast message from Mobile Device Services Gateway for "Respond to Roll Call" | | |
| 10 | | | Determines if "Last Am I Alive" transmission timestamp is within a programmed predetermined window | | |
| 11 | | | If "Last Am I Alive" transmission timestamp, sends to Mobile Device Services Gateway "Respond to Roll Call" message with information such as: Device ID and other site or application specific data | | |
| 12 | | | | Receives Mobile Device "Respond to Roll Call" message | |
| 13 | | | | Sends Acknowledgement message to Mobile Device, "Respond to Roll Call" Message | |
| 14 | | | Receives from Mobile Device Services Gateway "Respond to Roll Call" acknowledgement and resets "Last Am I Alive" transmission timestamp | Updates Roll Call mailbox list with Mobile Device ID and "Am I Alive" transmission timestamp | |
| 15 | | | Software application remains in listen mode for "Roll Call Response" Message | Sends acknowledgement message to Mobile Device for receipt of "Respond to Roll Call" | |
| 16 | | | Receives "Roll Call Response" acknowledgement message from Mobile Device Services Gateway | Updates "Am I Alive Group" list values of Mobile Device last communication session timestamp and Device ID | |
| 17 | | | | After waiting for Mobile Device's "Respond to Roll Call" | |

TABLE 1-continued

"Roll Call" Message Method

| Sequence | Mobile Device User | Initiating Mobile Device | Other Mobile Devices | Mobile Device Services Gateway | Data Concentrator |
|---|---|---|---|---|---|
| | | | | message, the Mobile Device Services Gateway sends "Roll Call Done" message to all Mobile Devices who were updated in the Roll Call mailbox list | |
| 18 | | | Receives "Roll Call Done" message from Mobile Device Services Gateway and listens for "Receives Roll Call Mailbox List Done" message | Performs synchronization of last communication timestamp for the Mobile Device that responded. (Set all device ID's last timestamp in group to be the same) | |
| 19 | | | | Sends Roll Call Mailbox to all Mobile Devices who responded to "Response to Roll" call | |
| 20 | | Receives Roll Call mailbox list from Mobile Device Services Gateway | Receives Roll Call mailbox list from Mobile Device Services Gateway | | |
| 21 | | Sends "Received Roll Call Mailbox List" message to Mobile Device Services Gateway | Sends "Receives Roll Call Mailbox List" message to Mobile Device Services Gateway | | |
| 22 | | | | Receives "Received Roll Call Mailbox List" message and sends acknowledgement to other Mobile Devices and/or initiating Mobile Device | |
| 23 | | Receives Mobile Device Services Gateway "Received Roll Call Mailbox List" acknowledgement | Receives Mobile Device Services Gateway "Received Roll Call Mailbox List" acknowledgement | | |
| 24 | | Stores "Am I Alive" transmission timestamp with most current time in Roll Call Mail List | Stores "Am I Alive" transmission timestamp with most current time in Roll Call Mail List | | |
| 25 | | Sends Data Concentrator "Am I Alive" Message | | | |
| 26 | | | | Processes initiating Mobile Device communication Request | |

TABLE 1-continued

"Roll Call" Message Method

| Sequence | Mobile Device User | Initiating Mobile Device | Other Mobile Devices | Mobile Device Services Gateway | Data Concentrator |
|---|---|---|---|---|---|
| 27 | | | | | Receives "Am I Alive" message from Mobile Device |
| 28 | | | | | Sends Mobile Device "Am I Alive message acknowledgement |
| 29 | | | | Process Data Concentrator communication to initiating Mobile Device | |
| 30 | | Receives Data Concentrator "Am I Alive" message acknowledgement | | | |
| 31 | | Sends Data Concentrator "Am I Alive" group list | | | |
| 32 | | | | Processes initiating Mobile Device communications to Data Concentrator | |
| 33 | | | | | Receives Mobile Device "Am I Alive" group list |
| 34 | | | | | Sends "Am I Alive" group list acknowledgement to initiating Mobile Device |
| 35 | | | | Processes Data Concentrator communication to initiating Mobile Device | Processes Mobile Device "Am I Alive" group list into log files |
| 36 | | Receives Data Concentrator "Am I Alive" group list acknowledgement | | | |
| 37 | | Updates "Am I Alive" last transmission timestamp to current time in group list and for the Mobile Device application | | | |
| 38 | | Sends Mobile Device Services Gateway "Confirmed Roll Call Timestamp" message | | | |
| 39 | | | | Receives "Confirmed Roll Call Timestamp message | |
| 40 | | | | Sends initiating Mobile Device "Confirm Roll Call Timestamp" acknowledgement | |
| 41 | | Receives Mobile Device Services Gateway | | | |

TABLE 1-continued

"Roll Call" Message Method

| Sequence | Mobile Device User | Initiating Mobile Device | Other Mobile Devices | Mobile Device Services Gateway | Data Concentrator |
|---|---|---|---|---|---|
| 42 | | "Confirmed Roll Call Acknowledgement" message Sends Mobile Device Services Gateway "Am I Alive" group list | | | |
| 43 | | | | Receives initiating Mobile Device "Am I Alive" group list. Replaces existing list | |
| 44 | | | | Sends initiating Mobile Device "Am I Alive" group list acknowledgement | |
| 45 | | Receives Mobile Device Services Gateway "Am I Alive" group list acknowledgement | | Sends "Confirmed Roll Call" broadcast message to other Mobile Devices | |
| 46 | | Turns off "Roll Call" listener for more messages | Receives from Mobile Device Services Gateway, "Confirmed Roll Call" broadcast message | | |
| 47 | | | Sends Mobile Device Services Gateway "Get Confirmed Roll Call" message | | |
| 48 | | | | Receives other Mobile Devices "Get Confirmed Roll Call" message | |
| 49 | | | | Sends other Mobile Devices "Get Confirmed Roll Call" acknowledgement | |
| 50 | | | Receives from Mobile Device Services Gateway, "Get Confirmed Roll Call" message | | |
| 51 | | | | Sends other Mobile Devices "Am I Alive" group list | |
| 52 | | | Receives from Mobile Device Services Gateway "Am I Alive" group list | | |
| 53 | | | | Sends to other Mobile Device "Am I Alive" group list complete message | |
| 54 | | | Receives from Mobile Device Services Gateway, | | |

TABLE 1-continued

"Roll Call" Message Method

| Sequence | Mobile Device User | Initiating Mobile Device | Other Mobile Devices | Mobile Device Services Gateway | Data Concentrator |
|---|---|---|---|---|---|
| 55 | | | "Am I Alive" group list complete message Updates "Am I Alive" last transmission timestamp | Sends to other Mobile Devices "Received Roll Call Mailbox List Done" | |
| 56 | | | Receives from Mobile Device Services Gateway, "Received Roll Call Mailbox List Done" | | |

Terminology used throughout this document is described in this section. To articulate a technical approach, definitions are used to describe the more common terms.

| Term | Definition |
|---|---|
| Mobile Device | A data computing device that is portable and used by a human. The data computing device may have automated data input methods such as bar code readers, digitizers, voice recognition, magnetic stripe readers, and optical character recognition |
| Mobile Device Management | The process of electronically managing the mobile device for the intent of collecting information or improving the common system functions. This may include but not be limited to software application updates, mobile device performance data, executing remote procedures (such as diagnostics or resource tools) |
| Device and Group Specific Data | Information relating to a geographical location of the system or system components (i.e., Mobile Device, or Mobile Device Services Gateway). The information may consist of (but not be limited to) site name, address, telephone number, networking properties, associated information technology devices, business usage rules, etc. |

An example communication system 100 in accordance with the present includes a data concentrator computer 60, a gateway device 70 for communicating with the data concentrator computer, a first mobile data acquisition device 40 communicating with the gateway device, and a second mobile data acquisition device 50 communicating with the gateway device. The gateway device 70 allows direct communication between the first and second mobile data acquisition devices 40, 50 without communication with the data concentrator computer 60.

Another example communication system in accordance with the present invention includes a data concentrator computer 60, a mailbox 72 for communicating with the data concentrator computer, a first mobile data acquisition device 40 communicating with the mailbox, and a second mobile data acquisition device 50 communicating with the mailbox. The mailbox 72 allows peer to peer communication between the first and second mobile data acquisition devices 40, 50 without communication with the data concentrator computer 60.

A computer program product 100 allows communication between a plurality of mobile devices 40, 50. The computer program product 100 includes: a first instruction 110 for activating a first mobile device 40; a second instruction 120 for requesting a roll call from a gateway device 70 by the first mobile device 40; a third instruction for broadcasting a please identify message to a second mobile device 50 and a third mobile device 50; and a fourth instruction for providing peer to peer communication between the first mobile device 40 and the second and third mobile devices 50.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

The invention claimed is:

1. A communication system comprising:
   a data concentrator computer;
   a mobile gateway device, separate and distinct from said data concentrator computer, for communicating with said data concentrator computer;
   a first mobile data acquisition device communicating with said mobile gateway device; and
   a second mobile data acquisition device communicating with said mobile gateway device,
   said mobile gateway device allowing direct communication between said first and second mobile data acquisition devices, through broadcast messages from said mobile gateway device to said first and second mobile data acquisition devices, without communication with said data concentrator computer.

2. The communication system as set forth in claim 1 wherein said first mobile data acquisition device initiates an "Am I Alive?" transmission.

3. The communication system as set forth in claim 1 wherein said first mobile data acquisition device sends a "Roll Call" request to said gateway device.

4. The communication system as set forth in claim 1 wherein said gateway device broadcasts a "Please Identify" message to said second mobile data acquisition device.

5. The communication system as set forth in claim 1 said second mobile data acquisition device transmits a device identification to said gateway device.

6. The communication system as set forth in claim 1 wherein said gateway device transmits an identification of said second mobile data acquisition device.

7. The communication system as set forth in claim 1 wherein said first mobile data acquisition device communicates with said data concentrator computer through said gateway device.

8. The communication system as set forth in claim 1 wherein said data concentrator computer sends a "Please Identify" message to said gateway device.

9. The communication system as set forth in claim 1 wherein said first mobile data acquisition device indicates that "Roll Call" data is available.

10. The communication system as set forth in claim 1 wherein said data concentrator computer sends a "Send Roll Call" request to said first mobile data acquisition device through said gateway device.

11. A communication system comprising:
a data concentrator computer;
a mobile mailbox, separate and distinct from said data concentrator computer, for communicating with said data concentrator computer;
a first mobile data acquisition device communicating with said mobile mailbox; and
a second mobile data acquisition device communicating with said mobile mailbox,
said mobile mailbox allowing peer to peer communication between said first and second mobile data acquisition devices, through broadcast messages from said mobile mailbox to said first and second mobile data acquisition devices, without communication with said data concentrator computer.

12. The communication system as set forth in claim 11 wherein said mobile mailbox maintains Roll Call Data for said first and second mobile data acquisition devices.

13. The communication system as set forth in claim 11 wherein said mobile mailbox services a Roll Call of said first and second mobile data acquisition devices.

14. The communication system as set forth in claim 11 further including a third mobile data acquisition device for communicating peer to peer with said first mobile data acquisition device.

15. The communication system as set forth in claim 11 wherein said mobile mailbox generates a Last Roll Call Timestamp.

16. A tangible medium storing a computer program product for communication between a plurality of mobile devices, said tangible medium comprising:
a first instruction for activating a first mobile device;
a second instruction for requesting a roll call from a gateway device by the first mobile device;
a third instruction for broadcasting a please identify message to a second mobile device and a third mobile device; and
a fourth instruction for providing peer to peer communication between the first mobile device and the second and third mobile devices through broadcast messages from a mobile mailbox to the first and second mobile devices, the peer to peer communication occurring without communication with a non-mobile data concentrator computer.

17. The tangible medium as set forth in claim 16 further including a fifth instruction for adding device identification data for the second and third mobile devices to a mailbox.

18. The tangible medium as set forth in claim 17 further including a sixth instruction for generating a history log of parsed roll call data by a data concentrator computer.

19. The tangible medium as set forth in claim 18 further including a seventh instruction for transmitting identification data to the mobile mail box by the second and third mobile device and a fourth mobile device.

20. The tangible medium as set forth in claim 19 further including an eighth instruction for transmitting a "Please Identify" message from the data concentrator computer to the first mobile device through the gateway device.

* * * * *